Dec. 27, 1927.                                                                1,654,360
                         J. H. ASHBAUGH
                         REGULATOR SYSTEM
                         Filed Oct. 4. 1924
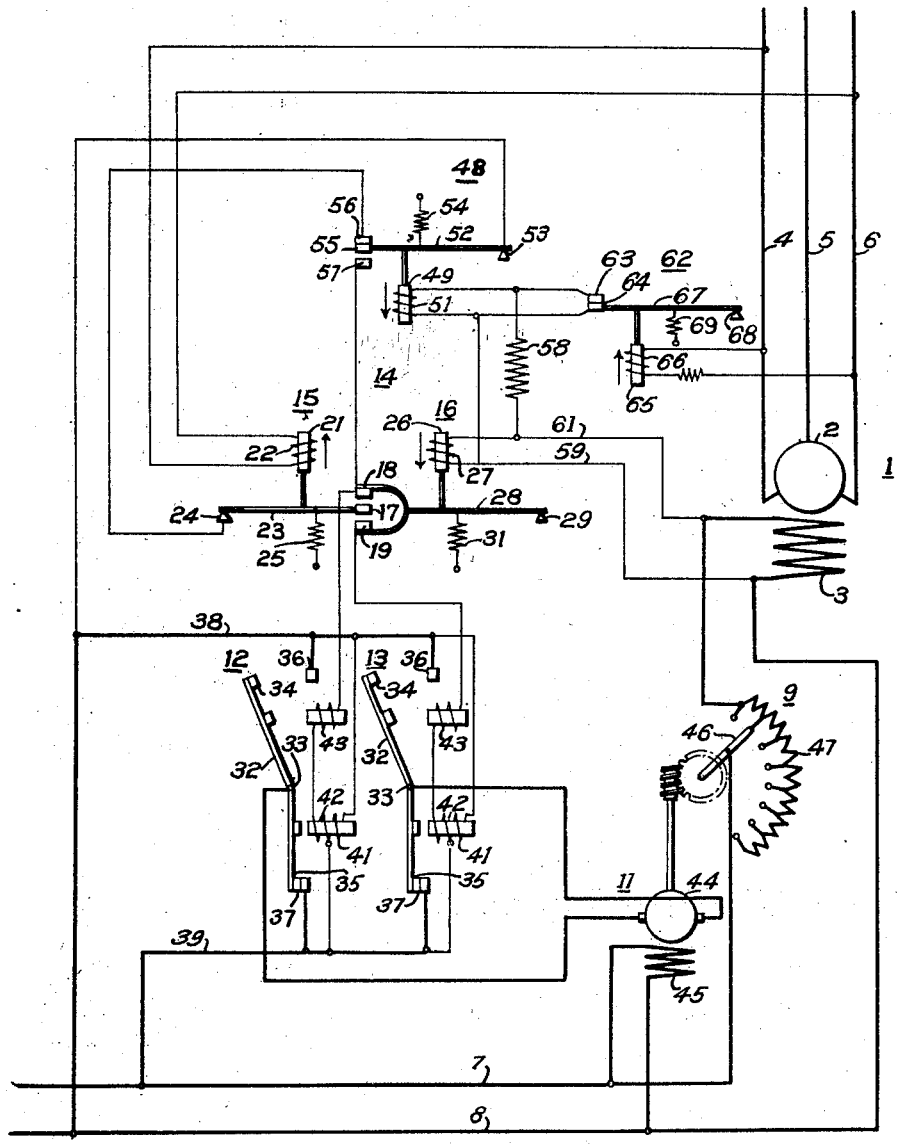
WITNESSES:                                                    INVENTOR
                                                         John H. Ashbaugh.
                                                              BY
                                                                   ATTORNEY Patented Dec. 27, 1927.

1,654,360

UNITED STATES PATENT OFFICE.

JOHN H. ASHBAUGH, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed October 4, 1924. Serial No. 741,643.

My invention relates to regulator systems and more particularly to regulator systems incorporating a short-circuit protective device.

In a regulator system wherein a dynamo-electric machine is used to supply energy to a power circuit, it is customary to maintain a constant machine voltage by varying the energization of the field windings of the dynamo-electric machine. In a regulator system operating to maintain a constant voltage upon the power circuit, should a short-circuit occur upon the system, the regulator will force the field excitation of the dynamo-electric machine considerably above its normal value in an attempt to maintain normal voltage upon the power circuit. Should the short-circuit be removed from the line while this high field excitation is maintained, the voltage of the machine will rise considerably above its normal value before the regulator can operate to decrease the field excitation again to bring the voltage back to its proper value.

One object of my invention is to provide a regulator system having a short-circuit protective device operative upon a short-circuit condition of the power line to limit the energization of the generator field winding to a certain percentage of its no-load value.

Another object of my invention is to provide a regulator system of the above-indicated character, having one regulator to govern the energization of the generator field winding in accordance with the generator voltage conditions over a normal range of the generator voltage, and a second regulator operative below a predetermined generator voltage to maintain a predetermined energization of the generator field winding.

My invention will be better understood by reference to the accompanying drawing, the single figure of which illustrates a system and apparatus embodying my invention.

Referring to the drawing, a generator 1 provided with an armature 2 and a field winding 3 supplies power to the circuit 4—5—6. The generator field winding 3 is supplied with energy from any suitable direct-current source, such as the circuit 7—8, through a motor-operated rheostat 9. The rheostat 9 is operated by a pilot motor 11 that is controlled by the reversing switches 12 and 13, that are actuated by the operation of the regulator 14. The regulator 14 comprises a control electromagnet 15 and an anti-hunting electromagnet 16.

The control electromagnet 15 actuates the movable contact member 17, co-operating with the contact members 18 and 19. The core member 21 of the control magnet is energized by the winding 22 connected to the power circuit supplied by the generator. This core member actuates an armature member 23 carrying the contact member 17 at one end and pivoted at the other end at 24, and opposes the action of a spring member 25. The anti-hunting magnet 16 comprises a core member 26, which is energized by the winding 27 in accordance with the voltage impressed upon the generator field winding 3, and actuates the armature member 28 against the action of a spring member 31. The armature 28 is pivoted at 29 and carries the contact members 18 and 19.

The reversing switches 12 and 13 are of like construction and comprise an arm member 32 pivoted at 33, carrying a contact member 34 on one arm and a contact member 35 on the other arm. Stationary contact members 36 and 37 are provided which co-operate, respectively, with the contact members 34 and 35. The switches are electrically operated from conductors 38—39 connected to the source of direct-current supply 7—8. Each switch is provided with a pair of electromagnets, the lower one having two differentially related windings 41 and 42. The winding 41 is permanently connected to the circuit 38—39 and acts as a holding coil to maintain the switch in the position shown in the drawing. The differentially-wound coil 42 of the lower magnet is connected in circuit with the coil 43 of the upper magnet, and these coils are energized in accordance with the operation of the regulator 14 to operate the switches 12 or 13, separating the contact members 35 and 37 and engaging the contact members 34 and 36.

The pilot motor 11 comprises an armature winding 44 and a field winding 45. The field winding is energized from the direct-current source 7—8 and the pilot motor armature winding is energized in accordance with the operation of the reversing switches 12 and 13. As the regulator 14 operates to make contact between the contact members 17 and one of the contact members 18 or 19, one of the reversing switches 12 or 13, will be operated to close contact members 34 and 36, energizing the motor 11 to operate in a forward or in a reverse direction, depending upon which of the reversing switches is operated.

Upon a separation of the contact member 17 from its co-operating contact member, de-energizing the operating coil of the reversing switch, the switch will then return to its dynamic-braking position through the operation of the holding coil 41, which is the position shown in the drawing. In this position, the armature 44 of motor is short-circuited through the contact members 35 and 37 of the reversing switches, and the conductor 39 thus forming a dynamic-braking circuit to quickly stop the motor. The motor 11 operates an arm 46 of the rheostat 9, cutting in or out of the field circuit more or less of the resistor 47.

My invention comprises also a second regulator 48 having a core member 49 provided with a winding 51. The core member 49 is connected to an armature 52 pivoted at 53 and operated against the action of a spring 54 to control the position of the contact member 55. The contact member 55 co-operates with contact members 56 and 57, the former of which is connected to the contact member 17 of the main regulator and the latter of which is connected to contact 18 of the regulator. The coil winding 51 is connected through a resistor 58 and conductors 59 and 61 to the field winding 3 of the generator.

A relay 62, provided with contact members 63 and 64 normally short-circuits the winding 51. The contact member 64 is actuated by the core member 65 which is energized by the winding 66 that is connected to the generator terminals or to the power circuit. The core member 65 is connected to an armature 67, pivoted at 68, and provided with a spring 69 normally opposing the action of the core member.

The operation of the system is as follows: So long as the generator voltage is above a predetermined value, the core member 65 of the relay 62 will be energized to maintain the contact members 63 and 64 closed, thus de-energizing the winding 51 of the regulator 48 and permitting the spring member 54 to maintain contact member 55 in engagement with the contact member 56. In this position of the relay 62 and the regulator 48, the contact member 17 of the regulator 14 is connected through the contact members 55 and 56 to the supply conductor 8, and the contact members 18 and 19 are connected through the operating coils of the switches 12 and 13 and the conductor 39 to the supply conductor 7, so that engagement of the contact member 17 with one of the contact members 18 or 19 will operate one of the switches 12 or 13, thereby operating the motor 11 to vary the setting of the rheostat 9.

The control magnet 15 of the regulator is actuated in accordance with the generator voltage to govern the position of the contact member 17 and, the anti-hunting magnet 16 is energized in accordance with the voltage impressed upon the generator field winding 3 to vary the position of the contact members 18 and 19. So long as the generator voltage, or the voltage of the power circuit, remains within a predetermined range, the regulator 14 will govern the excitation of the generator to maintain normal voltage. In case, however, a short circuit occurs upon the power line, forcing the voltage of the generator below normal, the voltage impressed upon the control magnet 15 would be correspondingly decreased, causing the contact member 17 to engage the contact member 19, thereby operating switch 13 so as to change the setting of the rheostat 9 to increase the strength of the generator field excitation to bring the generator voltage again to normal. If, however, the generator voltage falls below a predetermined minimum, the relay 62 will become deenergized sufficiently to separate the contact members 63 and 64, thus removing the short circuit upon the winding 51 and permitting this winding to be energized in accordance with the voltage impressed upon the generator field winding.

An increase in the voltage impressed upon the generator field winding above a predetermined value will cause the core member 49 to be energized sufficiently to overcome the influence of the spring member 54, separating the contact members 55 and 56 and engaging the contact members 55 and 57, thus operating the reversing switch 12, causing a decrease in the generator field excitation. In this way, the regulator 48 takes over the control of the motor 11 and maintains a predetermined field excitation upon the generator so long as the short circuit exists upon the line. When the short circuit is removed from the line, the generator voltage will increase rapidly to a certain percentage above its normal value, energizing the relay 62, causing a re-engagement of the contact members 63 and 64, thus short-circuiting the winding 51 and rendering the regulator 48 again inoperative. The regulation will then be continued by the regulator 14, as previously explained.

Many modifications in the apparatus and system as described will suggest themselves to those skilled in the art within the spirit of my invention and I do not wish to be limited other than by the scope of the appended claims.

I claim as my invention:

1. In a regulator system, the combination with a dynamo-electric machine having a field-magnet winding and means for normally regulating the energization of said field winding in accordance with the voltage of said dynamo-electric machine, of means rendered operable only below a predetermined machine voltage for maintaining the energization of said field winding substantially constant.

2. In a regulator system, the combination with a dynamo-electric machine having a field-magnet winding and means for normally regulating the energization of said field winding in accordance with the voltage of said dynamo-electric machine, of means rendered operable only below a predetermined machine voltage for maintaining a predetermined voltage across said field winding.

3. In a regulator system, the combination with a dynamo-electric machine having a field-magnet winding and a regulator for normally controlling the energization of said field winding in accordance with the voltage of said dynamo-electric machine, of a second regulator, operable over a predetermined range of machine voltage, for maintaining a predetermined constant energization of said field winding.

4. In a regulator system, the combination with a dynamo-electric machine having a field-magnet winding and a regulator for normally controlling the energization of said field winding in accordance with the voltage of said dynamo-electric machine, of a second regulator adapted to maintain a predetermined voltage across said field winding, and means operable over a predetermined range in machine voltage for transferring the control of said field winding from said first-named regulator to said second-named regulator.

5. In a regulator system, the combination with a dynamo-electric machine having a field-magnet winding and a regulator for normally controlling the energization of said field winding in accordance with the voltage of said dynamo-electric machine, of a second regulator for controlling the energization of said field winding comprising an electromagnet having a winding connected in parallel circuit relation to said field winding, and means for rendering said second regulator inoperative over a predetermined range in machine voltage.

6. In a regulator system, the combination with a dynamo-electric machine having a field-magnet winding and a regulator for normally controlling the energization of said field winding in accordance with the voltage of said dynamo-electric machine, of a second regulator for controlling the energization of said field winding comprising an electromagnet having a winding connected to be energized in accordance with the voltage impressed upon said field winding, and a relay for shunting the winding of said electromagnet to render said second regulator inoperative.

7. In a regulator system, the combination with a dynamo-electric machine having a field winding, of a regulator for controlling the energization of said field winding, said regulator comprising a contact member and means for actuating said contact member in accordance with the voltage of said machine, and a pair of co-operating contact members, a second regulator comprising a contact member, means for actuating said contact member in accordance with the voltage of said field winding, and a pair of co-operating contact members, and means for rendering said second-named regulator inoperative over a predetermined voltage range of said machine.

8. In a regulator system, the combination with a dynamo-electric machine having a field winding, of a regulator for controlling the energization of said field winding, said regulator comprising a contact member actuated in accordance with the voltage of said machine and a pair of contact members co-operating therewith, a second regulator for controlling the energization of said field winding comprising a contact member actuated in accordance with the voltage across said field winding and a pair of co-operating contact members, certain of the contact members of the first-named regulator being connected to contact members of the second-named regulator, and means for selecting one of said regulators to control said field winding over a predetermined voltage range of said dynamo-electric machine.

9. In a regulator system, the combination with a dynamo-electric machine having a field-magnet winding and a regulator for normally regulating the energization of said winding comprising an element actuated in accordance with the voltage of said machine and an element actuated in accordance with the voltage across said winding, a second regulator connected to be energized in accordance with the voltage across said field-magnet winding and adapted to regulate for a predetermined voltage on said winding, and means energized in accordance with the voltage of said machine for rendering said second regulator inoperative over a predetermined voltage range.

10. In a regulator system, the combination with a dynamo-electric machine having a field-magnet winding and a regulator for normally regulating the energization of said winding to maintain the voltage of said machine substantially constant, a second regulator arranged to supersede the action of the first-named regulator to limit the excitation of said field winding, said second regulator comprising a winding energized in accordance with the energization of said field-magnet winding, and means for de-energizing said regulator winding to render the same inoperative over a predetermined range in voltage of said dynamo-electric machine.

11. In a regulator system, the combination with a dynamo-electric machine having a field-magnet winding, and a regulator for normally regulating the excitation of said field-magnet winding to maintain the voltage of said machine substantially constant, a second regulator arranged to supersede the action of said first-named regulator to limit the excitation of said field winding, and means for initiating the action of said second regulator and for continuing its action over a predetermined range in the voltage of said machine.

In testimony whereof, I have hereunto subscribed my name this first day of October, 1924.

JOHN H. ASHBAUGH.